US012726493B2

(12) United States Patent
Lee et al.

(10) Patent No.: US 12,726,493 B2
(45) Date of Patent: Sep. 1, 2026

(54) CAN COMMUNICATION SECURITY METHOD FOR DETECTING CAN BUS ATTACKS, RECORDING MEDIUM AND CAN COMMUNICATION DEVICE FOR PERFORMING THE SAME

(71) Applicant: AY Innovative Co. Ltd., Seoul (KR)

(72) Inventors: Seong Soo Lee, Seoul (KR); Hyung Chul Im, Incheon (KR)

(73) Assignee: AY Innovative Co. Ltd., Seoul (KR)

( * ) Notice: Subject to any disclaimer, the term of this patent is extended or adjusted under 35 U.S.C. 154(b) by 0 days.

(21) Appl. No.: 18/949,177

(22) Filed: Nov. 15, 2024

(65) Prior Publication Data

US 2025/0168177 A1 May 22, 2025

(30) Foreign Application Priority Data

Nov. 16, 2023 (KR) ........................ 10-2023-0159095

(51) Int. Cl.
*H04L 9/40* (2022.01)

(52) U.S. Cl.
CPC ...... *H04L 63/1416* (2013.01); *H04L 63/1466* (2013.01)

(58) Field of Classification Search
CPC ............. H04L 63/1416; H04L 63/1466; H04L 63/0227; H04L 63/1425; H04L 63/1433; H04L 63/1458; H04L 12/40
See application file for complete search history.

(56) References Cited

U.S. PATENT DOCUMENTS 7,516,487 B1 * 4/2009 Szeto .................. H04L 63/0263 726/13
2015/0281272 A1 * 10/2015 Iyengar ............... H04L 63/1458 726/11
2023/0247035 A1 * 8/2023 Matsubayashi ..... H04L 63/1425 726/23
2023/0315852 A1 * 10/2023 Murphy ................ G06F 21/566
(Continued)

FOREIGN PATENT DOCUMENTS

JP 2023-515379 A 4/2023
JP 2025066622 A * 4/2025 ............. H04L 12/40
(Continued)

OTHER PUBLICATIONS

Choi et al., WO 2023/121148 A1, English translation. (Year: 2023).*
(Continued)

*Primary Examiner* — Sarah Su
(74) *Attorney, Agent, or Firm* — Stein IP LLC

(57) ABSTRACT

A Controller Area Network (CAN) communication security method in a CAN communication security apparatus for detecting a CAN bus attack by monitoring a CAN data frame through a CAN bus, which includes receiving a CAN data frame; analyzing the CAN data frame through a pre-learned intrusion detection systems (IDS) model to classify an attack type of the CAN bus; and filtering the classified attack type based on a pre-established rule. The efficiency of intrusion detection in IDS can be improved by reanalyzing the intrusion detection results in IDS based on rule-based filters that utilize actual attack patterns that can be observed in CAN bus traffic.

12 Claims, 7 Drawing Sheets

(56) References Cited

U.S. PATENT DOCUMENTS

| | | | | |
|---|---|---|---|---|
| 2024/0031404 A1* | 1/2024 | Lee | ..................... | H04L 63/0236 |
| 2025/0039228 A1* | 1/2025 | Crabtree | ............. | H04L 63/1425 |
| 2025/0203369 A1* | 6/2025 | Fuladi | ................... | H04L 41/342 |
| 2025/0227100 A1* | 7/2025 | Nagao | .................. | H04N 23/662 |

FOREIGN PATENT DOCUMENTS

| | | | | | |
|---|---|---|---|---|---|
| KR | 20180021287 A | * | 3/2018 | ............. | H04L 67/12 |
| KR | 10-1966345 B1 | | 4/2019 | | |
| KR | 10-2019-0096863 A | | 8/2019 | | |
| KR | 10-2017810 B1 | | 10/2019 | | |
| KR | 10-2021-0103972 A | | 8/2021 | | |
| KR | 10-2379324 B1 | | 3/2022 | | |
| KR | 10-2469399 B1 | | 11/2022 | | |
| WO | WO-2023121148 A1 | * | 6/2023 | ......... | H04L 63/1441 |

OTHER PUBLICATIONS

Kim et al., KR 20180021287 A, English translation. (Year: 2018).*

Intrusion Detection System Utilizing Cross-Check Rule-Based Filters for In-Vehicle Networks, IEEE Communication Letters, vol. 27, No. 11, Nov. 2023, pp. 1-5.

Lee, H., Hong, S. S., Lee, S., & Ha, J. (2023). Anomaly Detection in Vehicle Network Using Semi-Supervised Learning Model. Journal of the Korea Academia Industrial Cooperation Society, 24(2), 11-20. https://doi.org/10.5762/kais.2023.24.2.11.

* cited by examiner

FIG. 2

| SOF | ID | RTR | IDE | r0 | DLC | Data | CRC | ACK | EOF |
|---|---|---|---|---|---|---|---|---|---|

CAN COMMUNICATION SECURITY METHOD FOR DETECTING CAN BUS ATTACKS, RECORDING MEDIUM AND CAN COMMUNICATION DEVICE FOR PERFORMING THE SAME

CROSS-REFERENCE TO RELATED APPLICATIONS

This application claims the benefit of Korean Application No. 10-2023-0159095, filed Nov. 16, 2023, in the Korean Intellectual Property Office. All disclosures of the document named above are incorporated herein by reference.

TECHNICAL FIELD

The present invention relates to a CAN communication security method for detecting CAN bus attacks that can complement the failure to detect attacks in IDS (Intrusion Detection Systems) that detect attacks that may occur in CAN communication, a recording medium and a CAN communication apparatus for performing the same.

BACKGROUND ART

The increasing reliance on electronic control units (ECUs) to manage vehicle control technology is raising new cybersecurity concerns.

These ECUs connect to other vehicles or roadside infrastructure via On-Board Diagnostics-II (OBD-II) communications, but this greatly amplifies their potential cybersecurity vulnerabilities.

This presents the potential for remote attacks on vehicles via Bluetooth, Wi-Fi, and cellular networks.

This further threatens vehicle safety by making the controller area network (CAN) bus particularly vulnerable to cyber threats. For example, the CAN bus is responsible for managing safety-critical components in a vehicle, including powertrain and chassis systems such as the engine, accelerator, brakes, and steering.

In addition, OBD-II interfaces and V2X devices typically communicate with ECUs via the CAN bus, providing an easy path for attackers to disrupt the system, and vulnerability is further compounded by the lack of strong authentication and encryption mechanisms on the CAN bus.

The lack of a unique node address in CAN bus frames also complicates the task of identifying, filtering, or discarding malicious frames based on their source or destination.

To solve these problems, research is being conducted on the application of intrusion detection systems (IDS) that analyze extensive CAN bus traffic data, and in particular, machine learning (ML) or deep learning-based methods are attracting attention.

However, since deep learning techniques require a large amount of computation if these machine learning-based methods are used on servers outside the vehicle, vehicle safety cannot be guaranteed when the communication link is interrupted.

On the other hand, if the algorithms of these deep learning techniques are implemented on edge computing devices in the vehicle, it is difficult to achieve real-time intrusion detection while maintaining low power consumption.

On the other hand, although machine learning techniques have advantages in terms of efficiency, size, and power consumption, they often have lower intrusion detection efficiency than deep learning techniques, and current IDS methods often ignore actual attack patterns that can be observed in CAN bus traffic regardless of deep learning or machine learning structures.

For example, past statistics of CAN data frames that include both message ID and payload data are important input values for IDS. Nevertheless, these CAN data frames are rarely utilized in existing systems.

Therefore, it is necessary to improve the intrusion detection efficiency of existing IDS by reflecting actual attack patterns that can be observed in CAN bus traffic.

RELATED ART

Korean Patent Registration No. 10-1966345

DISCLOSURE

Technical Problem

The present invention has been made to solve the above problems, and an object of the present invention is to provide a CAN communication security method for detecting CAN bus attacks, which can improve the efficiency of intrusion detection in an IDS by reanalyzing the results of intrusion detection in an IDS based on a rule-based filter using actual attack patterns observable in CAN bus traffic, a recording medium and a CAN communication apparatus for performing the same.

Technical Solution

In order to achieve the above object, according to one embodiment of the present invention, a CAN (Controller Area Network) communication security method in a CAN communication security apparatus for detecting a CAN bus attack by monitoring a CAN data frame through a CAN bus comprises receiving a CAN data frame; analyzing the CAN data frame through a pre-learned intrusion detection systems (IDS) model to classify an attack-type of the CAN bus; and filtering the classified attack type based on a pre-established rule.

The attack type may comprise at least one of a DoS (Denial-Of Service) attack, a spoofing attack, and a fuzzy attack.

The filtering may comprise accumulatively counting the number of attacks by message ID of the corresponding CAN data frame whenever the classified attack type is the DoS attack.

The filtering may comprise, even if the CAN data frame is classified as normal in the classifying, if the number of attacks of the corresponding CAN data frame exceeds a preset threshold value, finally determining the attack type of the corresponding CAN data frame as the DoS attack.

The filtering may comprise, even if the number of attacks of the CAN data frame classified as the DoS attack in the classifying exceeds a preset threshold value, if the message ID value of the corresponding CAN data frame is greater than a preset ID threshold value based on a message ID value of a normal CAN data frame, finally determining the attack type of the corresponding CAN data frame as normal.

The filtering may comprise accumulatively counting the number of attacks by message ID and payload data of the corresponding CAN data frame whenever the classified attack type is the spoofing attack.

The filtering may comprise, even if the CAN data frame is classified as normal in the classifying, if the number of attacks corresponding to the message ID and payload data of the corresponding CAN data frame exceeds a preset threshold value, finally determining the attack type of the corresponding CAN data frame as the spoofing attack.

The filtering may comprise, if the number of attacks corresponding to the message ID of the CAN data frame classified as the spoofing attack in the classifying exceeds a preset threshold value, if the number of attacks corresponding to the payload data of the corresponding CAN data frame is less than or equal to a preset threshold value, finally determining the attack type of the corresponding CAN data frame as normal.

The filtering may comprise, even if the CAN data frame is classified as normal in the classifying, if the message ID of the corresponding CAN data frame is not included in the message ID set of normal data prepared in advance for real-time control of a vehicle, finally determining the attack type of the corresponding CAN data frame as a fuzzy attack.

The filtering may comprise, even if the CAN data frame is classified as normal in the classifying, if the distance between payload data of current and previous CAN data frames having the message ID of the corresponding CAN data frame and the number of '1' bits in the payload data bytes of the corresponding CAN data frame all satisfy a preset condition, finally determining the attack type of the corresponding CAN data frame as a fuzzy attack.

The distance between the payload data satisfies the preset condition may be a case, in which the distance between the payload data of the current and previous CAN data frames is greater than a distance threshold value set based on the distance between consecutive normal CAN data frames having the same message ID in the normal data set used to learn the IDS model.

The number of '1' bits satisfies the preset condition may be a case, in which when the number of '1' bits of more than half of the payload data bytes of the corresponding CAN data frame is greater than the maximum number of '1' bits of payload data bytes of a normal CAN data frame of a normal data set used to learn the IDS model at the same byte position.

Meanwhile, in order to achieve the above object, according to one embodiment of the present invention, a computer program for performing the intrusion prevention method for the CAN communication security method is recorded on the computer-readable recording medium.

In order to achieve the above object, according to one embodiment of the present invention, a CAN (Controller Area Network) communication security apparatus for detecting a CAN bus attack by monitoring a CAN data frame through a CAN bus, comprises a communication unit that receives the CAN data frame; an attack type classification unit that analyzes the CAN data frame through a pre-learned intrusion detection systems (IDS) model to classify an attack-type of the CAN bus; and a filtering unit that filters the classified attack type based on a pre-established rule.

The attack type may comprise at least one of a DoS (Denial-Of Service) attack, a spoofing attack, and a fuzzy attack.

Advantageous Effects

According to one aspect of the present invention described above, by providing a CAN communication security method for detecting a CAN bus attack, a recording medium and a CAN communication apparatus for performing the same, the efficiency of intrusion detection in an IDS can be improved by reanalyzing the intrusion detection result in the IDS based on a rule-based filter using an actual attack pattern observable in CAN bus traffic.

BRIEF DESCRIPTION OF DRAWINGS

These and/or other aspects will become apparent and more readily appreciated from the following description of the embodiments, taken in conjunction with the accompanying drawings in which:

FIG. 2 is a diagram for explaining the format of CAN data transmitted and received in CAN communication;

DETAILED DESCRIPTION OF EMBODIMENTS

Figure 1:
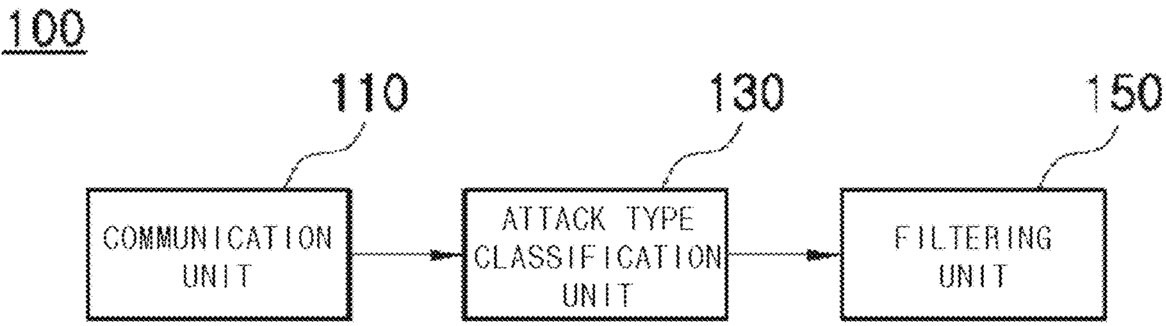
FIG. 1 is a block diagram for explaining the configuration of a CAN communication security apparatus according to one embodiment of the present invention.

The detailed description of the invention set forth below refers to the accompanying drawings which illustrate specific embodiments in which the invention may be practiced. These embodiments are described in sufficient detail to enable those skilled in the art to practice the invention. It should be understood that the various embodiments of the invention, while different from one another, are not necessarily mutually exclusive. For example, specific shapes, structures, and features described herein may be implemented in other embodiments without departing from the spirit and scope of the invention. It should also be understood that the positions or arrangements of individual components within each disclosed embodiment may be changed without departing from the spirit and scope of the invention. Accordingly, the detailed description set forth below is not intended to be limiting, and the scope of the invention is defined only by the appended claims, along with the full scope of equivalents to which such claims are entitled if properly so described. Like reference numerals in the drawings designate the same or similar functionality throughout the several aspects.

The components according to the present invention are components defined by functional distinction rather than physical distinction, and can be defined by the functions each performs. Each component may be implemented by hardware or program code and processing unit performing each function, and the functions of two or more components may be implemented by being included in one component. Therefore, the names given to the components in the following embodiments are not given to physically distinguish each component, but to imply a representative function performed by each component, and it should be noted that the technical idea of the present invention is not limited by the names of the components.

Hereinafter, a preferred embodiment of the present invention will be described in detail with reference to the attached drawings.

FIG. 1 is a block diagram for explaining the configuration of a CAN communication security apparatus 100 according to one embodiment of the present invention.

The CAN communication security apparatus (100, hereinafter referred to as the apparatus) according to the present embodiment is provided to improve the intrusion detection efficiency in the IDS by supplementing the case where an IDS that detects attacks occurring in CAN communication fails to detect the attack. To this end, the apparatus 100 according to the present embodiment can detect a CAN bus attack by monitoring a CAN data frame through the CAN bus.

The apparatus 100 according to the present embodiment may comprise a communication unit 110, an attack-type classification unit 130, and a filtering unit 150. In addition, the apparatus 100 may be installed and executed with software (application) for performing a CAN communication security method, and the communication unit 110, the attack type classification unit 130, and the filtering unit 150 may be controlled by the software (application) for performing the CAN communication security method.

At this time, the apparatus 100 may be a separate terminal or a part of a terminal module. In addition, the configuration of the communication unit 110, the attack type classification unit 130, and the filtering unit 150 may be formed as an integrated module or may be formed of one or more modules. However, on the contrary, each configuration may be formed as a separate module.

In addition, the apparatus 100 may be mobile or fixed. This apparatus 100 may be in the form of a server or an engine, and may be called by other terms such as a device, an apparatus, a terminal, a UE (user equipment), an MS (mobile station), a wireless device, a handheld device, etc. In addition, the apparatus 100 may execute or produce various software based on an operating system (OS), that is, a system. Here, the operating system is a system program that allows software to use the hardware of the apparatus, and may comprise all mobile computer operating systems such as Android OS, iOS, Windows Mobile OS, Bada OS, Symbian OS, and Blackberry OS, as well as computer operating systems such as Windows, Linux, Unix, MAC, AIX, and HP-UX.

First, before specifically explaining the configuration of the apparatus 100 of the present embodiment, the CAN bus will be explained.

The CAN bus may refer to a serial communication protocol designed for a real-time control system of a vehicle. This network communicates with most of the sensors, actuators, and processors inside the vehicle, and can improve noise and error resilience by using differential-pair lines.

The CAN bus operates at two voltage levels, including dominant and recessive. When multiple nodes attempt to simultaneously transmit conflicting signals, the dominant voltage level is dominant, ensuring that the '0' bit replaces the '1' bit.

Figure 2:
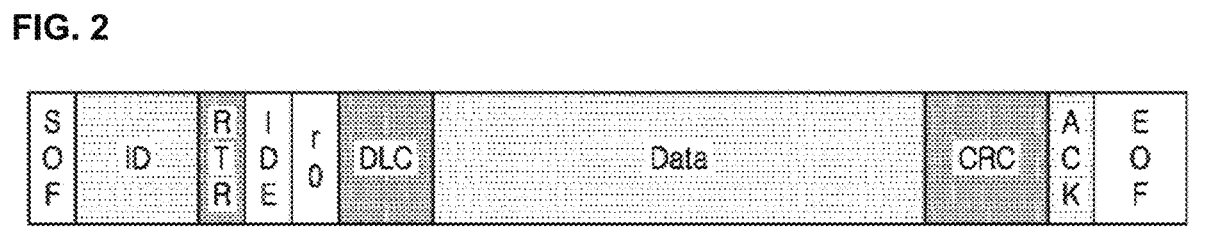

FIG. 2 is a diagram for explaining the CAN data format transmitted and received in CAN communication.

As shown in FIG. 2, each CAN data frame starts with an arbitration identifier (ID), also called CAN ID, and may comprise payload data.

Depending on the structure of this CAN data frame, during the arbitration phase, nodes transmitting '0' continue transmission, and nodes transmitting '1' switch to the receiving mode. Therefore, this mechanism ensures that the CAN node with the lowest message ID always completes signal transmission without interruption.

Meanwhile, attack types that attack the CAN bus can be divided into three categories, including DoS attacks, spoofing attacks, and fuzzy attacks.

First, in a DoS attack, the attacking node continuously monopolizes the CAN bus by transmitting a frame with a very high priority, for example, a low-value message ID such as 0x000. As a result, data transmission from other normal nodes is interrupted, and thus communication between ECUs is interrupted.

A spoofing attack is one in which an attacking node observes CAN bus traffic before initiating an attack and catalogs message IDs related to specific subsystem functions. Once the attack is initiated, the attacking node continuously transmits data frames with the same payload to induce system malfunction.

Another type of attack, a fuzzy attack, is one in which an attacking node transmits CAN data frames consisting of random message IDs and payloads. However, these CAN data frames used in a fuzzy attack do not have consistent patterns, making them difficult to detect, but the message IDs and payloads of the CAN data frames used in a fuzzy attack are significantly different from those of normal CAN data frames.

Therefore, the apparatus 100 according to the present embodiment can compensate for the failure of intrusion detection in an IDS by using a rule-based filter that utilizes the features of this type of attack.

First, a communication unit 110 is provided to receive a CAN data frame.

Then, the communication unit 110 can transmit the CAN data frame to an attack-type classification unit 130.

The attack type classification unit 130 can classify the attack type of the CAN bus by analyzing the CAN data frame through the intrusion detection systems (IDS) model that has been learned in advance.

Here, the attack type may comprise at least one of a DoS (Denial-of-Service) attack, a spoofing attack, and a fuzzy attack.

Therefore, the attack type classification unit 130 according to the present embodiment may output one of normal, DoS attack, spoofing attack, and fuzzy attack as a result of analyzing the received CAN data frame.

The attack type classification unit 130 may transmit the attack type of the CAN bus classified and output through the attack detection learning model to the filtering unit 150.

The attack detection model that the attack type classification unit 130 uses to classify the attack type can be learned using the automobile hacking data set as shown in Table 1 below, which comprises five different data sets of DoS attack, gear spoofing, RPM spoofing, fuzzy, and normal data sets. For this purpose, the attack type classification unit 130 may further comprise a learning unit.

TABLE 1

| Dataset | Normal Messages | Attacking Messages |
|---|---|---|
| DoS Attack | 3,078,250 | 587,521 |
| Spoofing Attack (Gear) | 3,845,890 | 597,252 |
| Spoofing Attack (RPM) | 3,966,805 | 654,897 |
| Fuzzy Attack | 3,347,013 | 491,847 |
| Normal | 988,871 | — |

Among these data sets, attack data sets such as DoS attacks, gear spoofing, RPM spoofing, and fuzzy data sets comprise both attack CAN data frames and normal CAN data frames, while normal data sets may comprise only normal CAN data frames. These data sets for learning can be split into a ratio of 70% for learning and 30% for testing.

At least one of the existing machine learning algorithms among Random Forest (RF), K-Nearest Neighbor (KNN), Multilayer Perceptron (MLP), and Support Vector Machine (SVM) can be used to generate the attack detection model, and each algorithm can be tailored to the binary classification task.

In the case of vehicle hacking, attack CAN frames are secretly inserted into the CAN bus of the vehicle, and the sequential pattern of CAN IDs is changed as a result of this signal injection.

Therefore, the attack type classification unit 130 according to the present embodiment learns the machine learning algorithm by utilizing the time interval features related to the same CAN ID.

Specifically, two-time intervals $I_{prev1}=T_{cur}-T_{prev1}$ and $I_{prev2}=T_{cur}-T_{prev2}$ were used as features for learning. Here, $T_{cur}$, $T_{prev1}$ and $T_{prev2}$ may respectively mean the timestamps of the current CAN data frame, the previous CAN data frame, and multiple frames having the same message ID.

This learned intrusion detection model may use not only the machine learning algorithm described above, but also other prediction models, and is not necessarily limited thereto.

In addition, although not shown in the drawing, the apparatus 100 may further comprise a storage unit for learning the intrusion detection model. A program for performing the CAN communication security method may be recorded in this storage unit.

In addition, the data processed by the communication unit 110, the attack type classification unit 130, and the filtering unit 150 may be temporarily or permanently stored, and a volatile storage medium or a nonvolatile storage medium may be comprised, but the scope of the present invention is not limited thereto.

In addition, the storage unit stores data accumulated while performing the CAN communication security method. For example, the storage unit may store data sets for learning, intrusion detection models, etc.

Meanwhile, the filtering unit 150 is provided to filter the attack types classified by the attack type classification unit 130 based on pre-established rules.

The filtering unit 150 may reanalyze the attack types of the CAN data frames in the attack type classification unit 130 to finally determine the attack type.

Below, for the convenience of explanation, the process of finally determining the attack type in the filtering unit 150 will be specifically described by attack type.

First, below, the case where the attack type classified by the attack type classification unit 130 is a DoS attack will be described.

As explained above, since the lower the ID value, the higher the transmission priority, the DoS attack is an attack that occupies the CAN bus and interferes with communication by injecting an ID with a small value such as 0x00 as the message ID.

Therefore, if the attack type classification unit 130 detects a CAN data frame with a high number of message IDs as a DoS attack, there is a high possibility that the prediction result of the attack type classification unit 130 is incorrect.

Based on this actual attack pattern, the filtering unit 150 according to the present embodiment may classify the current CAN data frame as a DoS attack based on the number of times the message ID has been previously classified as an attack.

To this end, the filtering unit 150 may cumulatively count the number of attacks by message ID of the corresponding CAN data frame whenever the attack type classification unit 130 classifies the CAN data frame as a DoS attack.

Therefore, even if the CAN data frame is classified as normal by the attack type classification unit 130 if the accumulated number of attacks of the corresponding CAN data frame exceeds a preset threshold value, the filtering unit 150 may finally determine the attack type of the corresponding CAN data frame as a DoS attack.

In addition, even if the accumulated number of attacks of a CAN data frame classified as a DoS attack by the attack type classification unit 130 exceeds a preset threshold value, the filtering unit 150 may finally determine the attack type of the CAN data frame as normal if the message ID value of the corresponding CAN data frame is greater than the preset ID threshold value based on the message ID value of the normal CAN data frame.

The specific process by which the filtering unit 150 makes a final decision on a DoS attack may be as shown in Algorithm 1 below.

[Algorithm 1]
Algorithm 1 DoS Attack Scenario

```
1: Train the ML-based IDS model
2: while Mornitoring results of the IDS do
3:   if decision of the IDS is DOS Attack then
4:     AC[ID_cur] + AC[ID_cur] + 1
5:     if AC[ID_cur] > FP_max then          ▷ (Rule 1)
6:       attack ← True
7:     else if ID_cur > ID_th then           ▷ (Rule 2)
8:       attack ← False
9:     else
10.      attack ← True
11:    end if
12:  else
13:    if AC[ID_cur] > FP_max then          ▷ (Rule 1)
14:      attack ← True
15:    else
16:      attack ← False
17:    end if
18:  end if
19: end while
```

Hereinafter, a rule-based filter for DoS attacks will be described in detail based on the above Algorithm 1.

As described in Algorithm 1, the filtering unit 150 increases the number of attacks, AC[ID], each time the attack type classification unit 130 classifies the frame as a DoS attack for each message ID.

In addition, when the message ID of the current CAN data frame is $ID_{cur}$, the filtering unit 150 may compare the number of related attacks, $AC[ID_{cur}]$, with the threshold value $FP_{max}$. Here, $FP_{max}$ may mean the maximum value of FP[ID] recorded in all message IDs.

After learning the intrusion detection model using the DoS attack data set, it is tested on the normal data set, and FP[ID] represents the number of false positive (FP) cases observed in the entire test results. In other words, $FP_{max}$ represents the most serious error that occurred in the intrusion detection model.

Therefore, if $AC[ID_{cur}]>FP_{max}$, it indicates that the number of attacks for the message ID of the current CAN data frame exceeds the error range of the attack detection model.

Accordingly, the filtering unit 150 sets this $FP_{max}$ as a threshold value, and if the number of attacks exceeds the threshold value, the corresponding CAN data frame is finally determined as a DoS attack regardless of the result of the attack type classification unit 130.

Another rule related to the DoS attack used in the filtering unit 150 is that even if the current CAN data frame is classified as a DoS attack in the intrusion detection model, the current CAN data frame is finally determined as normal.

Specifically, in a DoS attack, the attack node transmits a CAN data frame with a high priority, that is, a message ID with a low number. Therefore, if the current message ID indicated by $ID_{cur}$ exceeds a certain threshold value $ID_{th}$, there is a high possibility that the frame is normal.

This is a possible condition because it is difficult for an attack CAN data frame with a message ID with a high number to occupy the CAN bus. For example, the filtering unit 150 according to the present embodiment sets the ID threshold value to 0x100, but it is not necessarily limited to this. These ID threshold values can be set as empirical threshold values optimized by simulation, and may be changed at any time according to the ID used in the actual vehicle.

Therefore, even if the attack type classification unit 130 classifies the corresponding CAN data frame as a DoS attack, the filtering unit 150 may ultimately determine the corresponding CAN data frame as normal if $ID_{cur}>ID_{th}$.

In the meantime, the following will explain the case where the attack type classified by the attack type classification unit 130 is a spoofing attack.

As described above, the spoofing attack monitors CAN bus traffic before the attack node starts the attack and records the message ID related to a specific subsystem function. And, it is an attack that repeatedly transmits CAN data frames with the same payload data to cause malfunction when the attack node starts the attack with a specific message ID.

Therefore, the statistical history of the frequency of the specific ID and payload of the CAN data frame classified as a spoofing attack by the attack type classification unit 130 should be closely evaluated in the final attack type classification process.

To this end, the filtering unit 150 may finally determine the attack type of the current CAN data frame based on the number of times the message ID and payload data have been classified as an attack before through the intrusion detection model.

To this end, the filtering unit 150 may cumulatively count the number of attacks by message ID and payload data of the CAN data frame whenever the attack type of the CAN data frame is classified as a spoofing attack by the attack type classification unit 130.

Therefore, even if the CAN data frame is classified as normal by the attack type classification unit 130, if the number of attacks corresponding to the message ID and payload data of the corresponding CAN data frame exceeds a preset threshold value, the filtering unit 150 may finally determine the attack type of the corresponding CAN data frame as a spoofing attack.

In addition, if the number of attacks corresponding to the message ID of the CAN data frame classified as a spoofing attack by the attack type classification unit 130 exceeds a preset threshold value, but the number of attacks corresponding to the payload data of the corresponding CAN data frame is less than or equal to a preset threshold value, the filtering unit 150 may finally determine the attack type of the corresponding CAN data frame as normal.

The specific process by which the filtering unit 150 according to the present embodiment makes a final decision on a spoofing attack may be as shown in Algorithm 2 below.

[Algorithm 2]
Algorithm 2 Spoofing Attack Scenario

1: Train the ML-based IDS model
2: while Mornitoring results of the IDS do
3: if decision of the IDS is Spoofing Attack then
4: $AC_I[ID_{Cur}] \leftarrow AC_I[ID_{cur}] + 1$
5: $AC_D[DATA_{cur}] \leftarrow AC_D[DATA_{cur}] + 1$
6: if $AC_I[ID_{Cur}] > FP_{I,max}$ and $AC_D[DATA_{cur}] > FP_{D,max}$ then ▷ (Rule 1)
7: attack ← True
8: else if $AC_I[ID_{Cur}] > FP_{I,max}$ and $AC_D[DATA_{cur}] \leq FP_{D,max}$ then ▷ (Rule 2)
9: attack ← False
10: else
11: attack ← True
12: end if
13: else
14: if $AC_I[ID_{Cur}] > FP_{I,max}$ and $AC_D[DATA_{cur}] > FP_{D,max}$ then ▷ (Rule 1)
15: attack ← True
16: else
17: attack ← False
18: end if
19: end if
20: end while Hereinafter, a rule-based filter for spoofing attacks based on the above Algorithm 2 will be described in detail.

As described in Algorithm 2, the filtering unit 150 increases the number of attacks per ID for each message ID, $AC_I[ID]$, whenever the attack type classification unit 130 classifies the corresponding frame as a spoofing attack.

In addition, for payload data, similarly to the message ID, the filtering unit 150 increases the number of attacks per payload data, $AC_D[DATA]$, whenever the attack type classification unit 130 classifies the corresponding frame as a spoofing attack.

In addition, the filtering unit 150 may display the message ID and payload data of the current CAN data frame as $ID_{cur}$ and $Data_{cur}$, respectively, and compare the related attack counts $AC_I[ID]$ and $AC_D[DATA]$ with the respective threshold values $FP_{I,max}$ and $FP_{D,max}$.

Here, $FP_{I,max}$ and $FP_{D,max}$ may mean the maximum values of FP[ID] and FP[Data] recorded in all message IDs and payload data, respectively.

After learning the intrusion detection model using the spoofing attack data set, it is tested on the normal data set, where FP[ID] and FP[Data] represent the number of false positive cases observed in the entire test results for each message ID and payload data, respectively. In other words, $FP_{I,max}$ and $FP_{D,max}$ represent the most serious errors that occurred in the intrusion detection model.

Therefore, if $AC_I[ID_{cur}]>FP_{I,max}$ and $AC_D[Data_{cur}]>FP_{D,max}$, it indicates that the number of attacks on the current CAN data frame exceeds the error range of the intrusion detection model.

Accordingly, the filtering unit 150 sets $FP_{I,max}$ and $FP_{D,max}$ as threshold values, and if the number of attacks on the message ID and payload data both exceed the threshold values, the corresponding CAN data frame is finally determined as a spoofing attack regardless of the result of the attack type classification unit 130.

In addition, another rule related to the spoofing attack used in the filtering unit 150 is that even if the intrusion detection model classifies the current CAN data frame as a spoofing attack, the current CAN data frame is finally determined as normal.

Specifically, in a spoofing attack, the attacking node repeatedly transmits an attack CAN data frame with a specific message ID related to the device that the attacker wants to manipulate using the same payload data.

However, since normal nodes keep the message ID constant but frequently change the payload data, they generally transmit various payload data with the same message ID. Therefore, if the current message ID has been previously classified as an attack many times, but the payload data has not, there is a high possibility that the frame is normal.

Therefore, even if the attack type classification unit 130 classifies the CAN data frame as a spoofing attack, the filtering unit 150 according to the present embodiment may finally determine the CAN data frame as normal based on the actual attack pattern if $AC_I[ID_{cur}] > FP_{I,max}$ and $AC_D[Data_{cur}] \leq FP_{D,max}$.

In the meantime, the following will describe a case where the attack type classified by the attack type classification unit 130 is a fuzzy attack.

As described above, a fuzzy attack is an attack in which an attacking node transmits a CAN data frame comprising a random message ID and payload data, and it is difficult to detect because there is no consistent pattern in such CAN data frames.

However, since the message ID and payload data of the CAN data frame based on such a fuzzy attack are significantly different from the normal CAN data frame, they should be closely evaluated based on the normal CAN data frame previously classified as normal.

To this end, even if the CAN data frame is classified as normal through the intrusion detection model, the filtering unit 150 may finally determine that the CAN data frame is a fuzzy attack regardless of the classification result of the intrusion detection model if the message ID of the current CAN data frame does not exist in the normal data set.

In addition, even if the CAN data frame is classified as normal through the intrusion detection model, the filtering unit 150 may finally determine the attack type of the CAN data frame as a fuzzy attack, if the distance between the payload data of the current and previous CAN data frames having the message ID of the corresponding CAN data frame and the number of '1' bits in the payload data bytes of the corresponding CAN data frame all satisfy the preset conditions.

The specific process by which the filtering unit 150 according to the present embodiment makes a final decision on a fuzzy attack may be as shown in Algorithm 3 below.

[Algorithm 3]

Algorithm 3 Fuzzy Attack Scenario

1: Train the ML-based IDS model
2: while Mornitoring results of the IDS do
3: if decision of the IDS is Fuzzy Attack then
4: attack ← True
5: else
6: if $ID_{cur} \notin Z_{normal}$ then ▷ (Rule 1)
7: attack ← True
8: else if $H_{cur} > H_{max}[ID_{cur}]$ and $BC_{cur} \geq DLC_{cur}/2$ then ▷ (Rule 2)
9: attack ← True
10: else
11: attack ← False
12: end if
13: end if
14: end while Hereinafter, the rule-based filter for fuzzy attacks based on the above algorithm 3 will be described in detail.

First, among the above-described data sets used to learn the intrusion detection model, all message IDs of the normal data set serve as the basis for vehicle control in the CAN bus for vehicle control.

At this time, the entire message ID set of normal data is indicated as $Z_{normal}$, and the message ID of the current CAN data frame is indicated as $ID_{cur}$.

Therefore, as described in Algorithm 3, the filtering unit 150 according to the present embodiment may finally determine the attack type of the corresponding frame as a fuzzy attack even if the corresponding CAN data frame is classified as normal in the intrusion detection model if the message ID of the corresponding CAN data frame is not included in the message ID set of normal data prepared in advance for real-time control of the vehicle.

In addition, another rule related to the fuzzy attack used in the filtering unit 150 is a case where the current CAN data frame is finally determined as a fuzzy attack even if the corresponding CAN data frame is classified as normal in the intrusion detection model.

Figure 3:
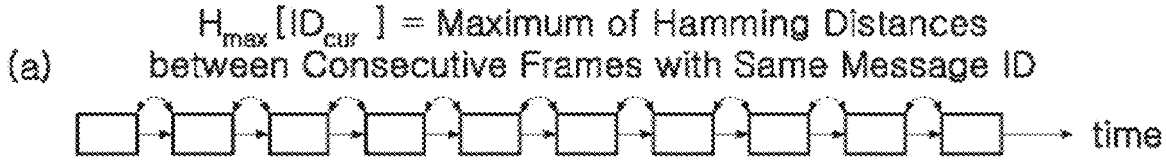
FIG. 3 to FIG. 5 are diagrams for explaining the Hamming distance used by the CAN communication security apparatus to filter attack types according to one embodiment of the present invention.
Figure 4:
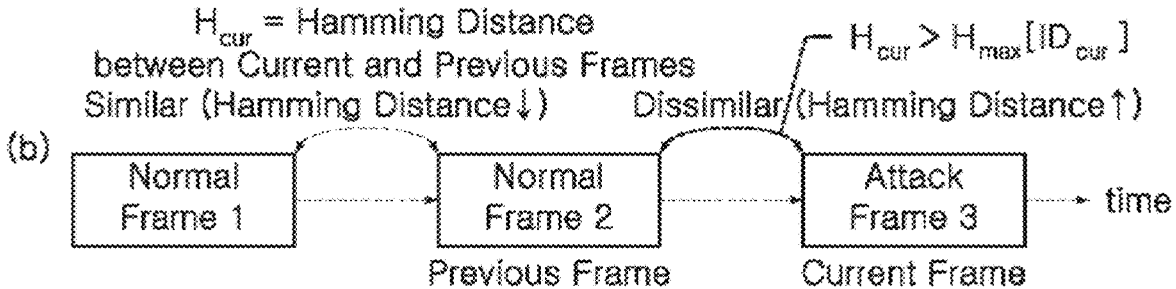
Figure 5:
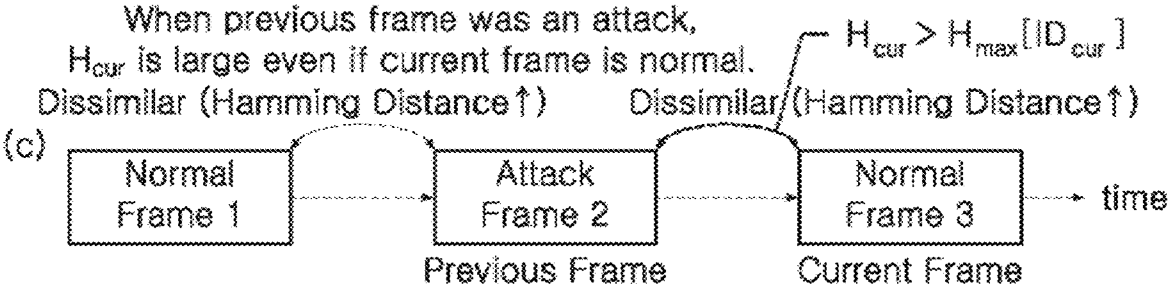
Figure 6:
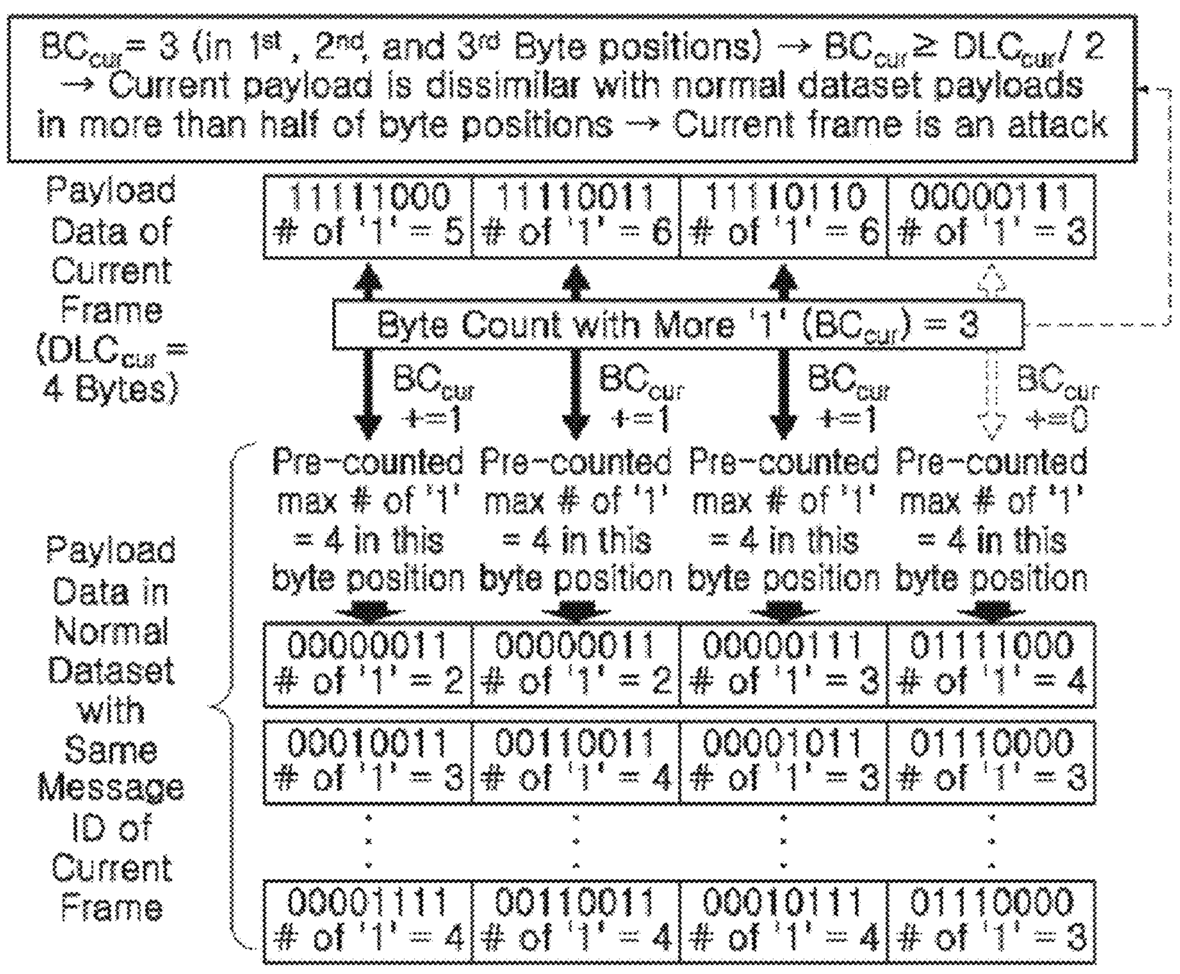
FIG. 6 is a diagram for explaining the difference in the positions of bytes used by the CAN communication security apparatus to filter attack types according to one embodiment of the present invention.

FIGS. 3 to 5 are drawings for explaining the Hamming distance used by the filtering unit 150, and FIG. 6 is a drawing for explaining the difference in the position of bytes used by the filtering unit 150.

Even if the CAN data frame is classified as normal through the intrusion detection model, the filtering unit 150 may finally determine the attack type of the CAN data frame as a fuzzy attack if the distance between the payload data of the current and previous CAN data frames having the message ID of the corresponding CAN data frame and the number of '1' bits of the payload data bytes of the corresponding CAN data frame all satisfy preset conditions.

Here, the distance between the payload data satisfies the preset condition may be a case where the distance between the payload data of the current and previous CAN data frames is greater than a distance threshold value set based on the distance between consecutive normal CAN data frames having the same message ID in the normal data set used to learn the attack detection model.

And, the number of '1' bits satisfying the preset condition may be the case where the number of '1' bits of more than half of the payload data bytes of the corresponding CAN data frame is greater than the maximum number of '1' bits of the payload data bytes of the normal CAN data frame of the normal data set used to learn the attack detection model at the same byte position.

Specifically, the payload data of the CAN data frame used in the fuzzy attack is randomly generated, and its value is not similar to the payload data of the normal CAN data frame. Therefore, the filtering unit 150 according to the present embodiment may finally determine the fuzzy attack by utilizing the features of the actual attack pattern that the payload data according to the fuzzy attack and the normal payload data show major differences in the differences between the consecutive frames and the differences between the byte positions.

FIGS. 3 to 6 are diagrams for explaining the conditions for evaluating the differences between the payload data of two consecutive frames having the same message ID. In the case of the normal frame, the consecutive payloads show high similarity, but the payloads of the normal frame and the attack frame are significantly different.

Specifically, FIG. 3 is a diagram illustrating the Hamming distance between the same message IDs in a normal data set. And the variable $H_{max}[ID_{cure}]$ may mean the maximum Hamming distance recorded between two consecutive frames in a normal data set with $ID_{cur}$. In other words, the distance threshold used by the filtering unit 150 means $H_{max}[ID_{cure}]$.

FIG. 4 is a diagram illustrating a case where the current CAN data frame is a fuzzy attack, and FIG. 5 is a diagram illustrating a case where the current frame is normal but the previous CAN data frame with the same message ID is a fuzzy attack.

In FIGS. 4 and 5, $H_{cur}$ means the Hamming distance between the payload data of the current frame and the immediately preceding frame having the same message ID.

As shown in FIG. 4, when the current frame is an attack frame, $H_{cur}>H_{max}[ID_{cure}]$ is established, but as shown in FIG. 5, $H_{cur}>H_{max}[ID_{cure}]$ is established even in the case because the previous CAN data frame having the same ID is an attack, even though the current frame is actually normal.

Due to the overlapping of these conditions, an additional parameter is required to accurately distinguish between normal frames and attack frames. For this purpose, the filtering unit 150 may use the number of '1' bits as a criterion.

As shown in FIG. 6, if more than half of the payload data bytes of the current CAN data frame include a greater number of '1' bits than other payload data bytes of the normal data set at the same byte position, the filtering unit 150 may finally determine the corresponding CAN data frame as a fuzzy attack.

If the payload data bytes of the current CAM data frame are $DLC_{cur}$=4 bytes as shown in FIG. 6, if the maximum number of 1 bit in each byte position of the data frame having the same ID as the current frame among the normal data is greater than the maximum value, the value $BC_{cur}$ can be calculated by accumulating 1.

In FIG. 6, more specifically, the process in which the filtering unit 150 compares the byte positions of the normal payload data having the same ID as the message ID of the current frame among the normal data sets will be described.

The maximum number of 1 bit in the 1-byte position of the normal frame is 4, but the number of 1 bit in the 1-byte position of the current frame is 5, so the filtering unit 150 increases $BC_{cur}$ by 1.

Similarly, the maximum number of 1 bit in the 2-byte position of the normal frame is 4, but the number of 1 bits in the 2-byte position of the current frame is 6, so the filtering unit 150 increases $BC_{cur}$ by 1.

And since the maximum number of 1 bit at the 3-byte position of the normal frame is 4, but the number of 1 bit at the 3-byte position of the current frame is 6, the filtering unit 150 increases $BC_{cur}$ by 1.

Also, since the maximum number of 1 bit at the 4-byte position of the normal frame is 4, and the number of 1 bits at the 4-byte position of the current frame is 3, the filtering unit 150 does not increase $BC_{cur}$. Therefore, since the final accumulated count value $BC_{cur}$ is 3, and this value $BC_{cur}$ is greater than or equal to 2, which is half of $DLC_{cur}$=4, the filtering unit 150 finally determines the frame as a fuzzy attack.

In other words, even if the CAN data frame is classified as normal for a fuzzy attack by the attack type classification unit 130, if the Hamming distance of the CAN data frame exceeds the threshold value and the number of 1 bit in a payload data byte exceeds the number of 1 bit in a payload data byte of a normal frame by more than half of the total bytes, the filtering unit 150 may finally determine the frame as a fuzzy attack.

The apparatus 100 according to the present embodiment can improve the intrusion detection efficiency in the IDS by reanalyzing the attack type through the filtering unit 150 even if the attack type classification unit 130 including the intrusion detection model fails to predict the attack type for the CAN data frame.

Figure 7:
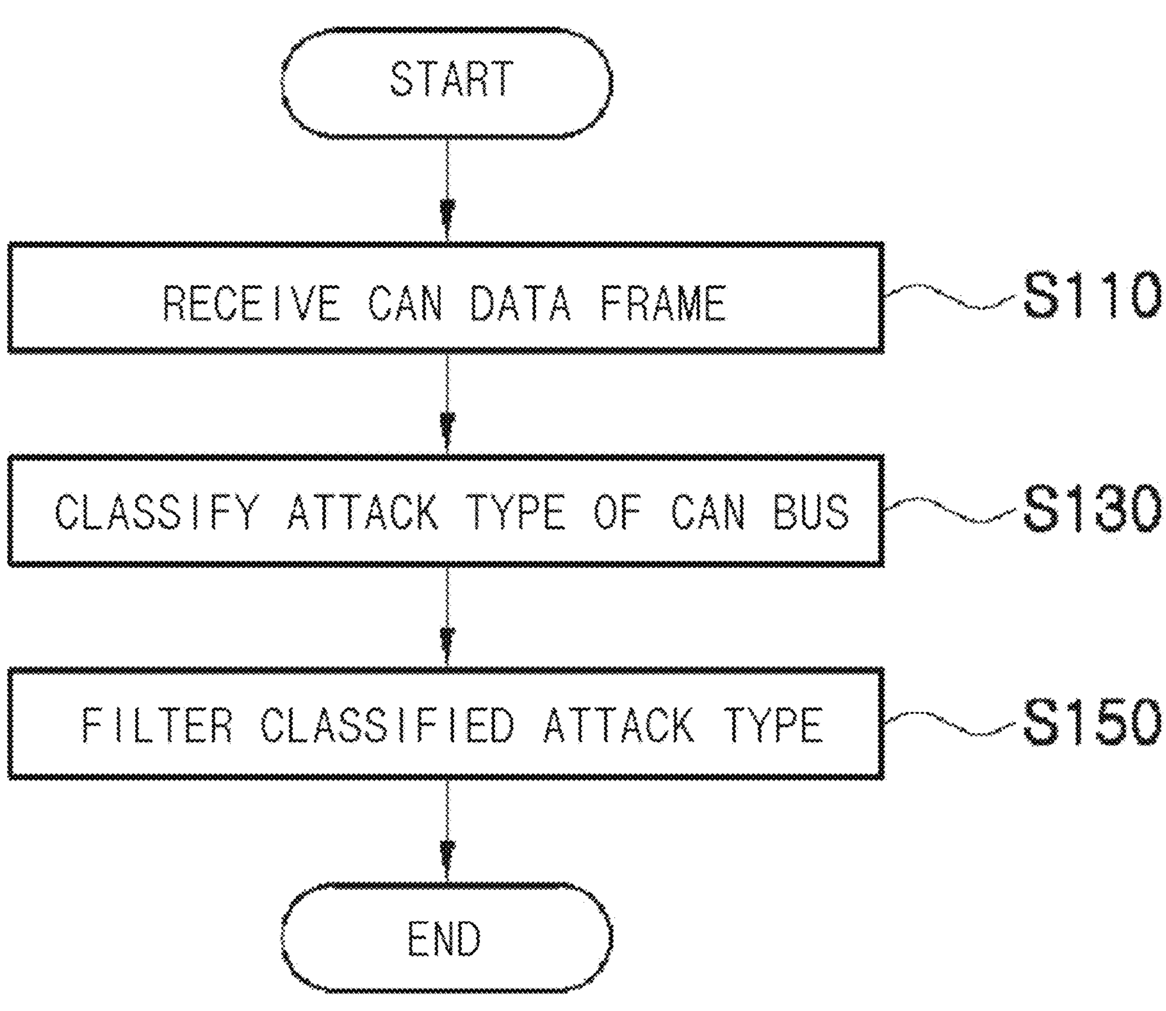
FIG. 7 is a flowchart for explaining a CAN communication security method according to one embodiment of the present invention.

Meanwhile, FIG. 7 is a flow chart for explaining a CAN communication security method according to an embodiment of the present invention. Since the CAN communication security method according to an embodiment of the present invention is performed on a configuration substantially identical to that of the CAN communication security apparatus 100 illustrated in FIG. 1, the same reference numerals are assigned to the same components as those of the CAN communication security apparatus 100 illustrated in FIG. 1, and repeated descriptions are omitted.

The CAN communication security method according to an embodiment of the present invention comprises a step of receiving a CAN data frame (S110), a step of classifying an attack-type of a CAN bus (S130), and a step of filtering the classified attack type (S150).

In the step of receiving a CAN data frame (S110), the communication unit 110 may receive a CAN data frame through the CAN bus.

In the step of classifying the attack type of the CAN bus (S130), the attack type classification unit 130 may classify the attack type of the CAN bus by analyzing the CAN data frame through the Intrusion Detection Systems (IDS) model that has been learned in advance.

In the step of classifying the attack type of the CAN bus (S130), the attack type classified by the attack type classification unit 130 may comprise at least one of a DoS (Denial-Of Service) attack, a spoofing attack, and a fuzzy attack.

In the step of classifying the attack type of the CAN bus (S130), the attack type classified by the attack type classification unit 130 may be transferred to the step of filtering (S150).

In the step of filtering the classified attack type (S150), the filtering unit 150 may filter the attack type classified in the step of classifying the attack type of the CAN bus based on a rule that has been prepared in advance (S130).

And, in the step of filtering the classified attack type (S150), the filtering unit 150 may comprise a step of accumulating and counting the number of attacks by message ID of the corresponding CAN data frame whenever the classified attack type is the DoS attack.

In the step of filtering the classified attack type (S150), even if the CAN data frame is classified as normal in the classification step (S130), if the number of attacks of the corresponding CAN data frame exceeds a preset threshold value, the filtering unit 150 may finally determine the attack type of the corresponding CAN data frame as a DoS attack in the filtering step (S150).

In addition, in the step of filtering the classified attack type (S150), even if the message ID value of the CAN data frame classified as a DoS attack in the classification step (S130) exceeds a preset threshold value, the filtering unit 150 may finally determine the attack type of the CAN data frame as normal If the message ID value of the corresponding CAN data frame is greater than the preset ID threshold value based on the message ID value of the normal CAN data frame.

The filtering step (S150) may comprise a step in which the filtering unit 150 accumulates and counts the number of attacks by message ID and payload data of the corresponding CAN data frame whenever the classified attack type is a spoofing attack.

In the filtering step (S150), even if the CAN data frame is classified as normal in the classification step (S130), if the number of attacks corresponding to the message ID and payload data of the corresponding CAN data frame exceeds a preset threshold value, the filtering unit 150 may finally determine the attack type of the corresponding CAN data frame as a spoofing attack.

In addition, in the filtering step (S150), if the number of attacks corresponding to the message ID of the CAN data frame classified as a spoofing attack in the classification step (S130) exceeds a preset threshold value, but the number of attacks corresponding to the payload data of the corresponding CAN data frame is less than or equal to the preset threshold value, the filtering unit 150 may finally determine the attack type of the corresponding CAN data frame as normal.

In the filtering step (S150), the filtering unit 150 may finally determine the attack type of the corresponding CAN data frame as a fuzzy attack if the message ID of the corresponding CAN data frame is not included in the message ID set of normal data prepared in advance for real-time control of the vehicle, even if the CAN data frame is classified as normal in the classification step (S130).

In addition, in the filtering step (S150), the filtering unit 150 may finally determine the attack type of the corresponding CAN data frame as a fuzzy attack if the distance between the payload data of the current and previous CAN data frames having the message ID of the corresponding CAN data frame and the number of '1' bits in the payload data bytes of the corresponding CAN data frame all satisfy the preset conditions, even if the CAN data frame is classified as normal in the classification step (S130).

At this time, the distance between the payload data satisfies the preset condition when the distance between the payload data of the current and previous CAN data frames having the same message ID is greater than the distance threshold value set based on the distance between consecutive normal CAN data frames having the same message ID in the normal data set used to learn the attack detection model.

On the other hand, the number of '1' bits satisfies the preset condition when the number of '1' bits that more than half of the payload data bytes of the corresponding CAN data frame have is greater than the maximum number of '1' bits that the payload data bytes of the normal CAN data frame of the normal data set used to learn the attack detection model at the same byte position have.

The CAN communication security method of the present invention can be implemented in the form of program instructions that can be executed through various computer components and recorded on a computer-readable recording medium. The computer-readable recording medium may comprise program instructions, data files, data structures, etc., singly or in combination.

The program instructions recorded on the above computer-readable recording medium may be those specially designed and configured for the present invention or may be those known and available to those skilled in the art of computer software.

Examples of computer-readable recording medium comprise magnetic media such as hard disks, floppy disks, and magnetic tapes, optical recording media such as CD-ROMs and DVDs, magneto-optical media such as floptical disks, and hardware devices specially configured to store and execute program instructions such as ROMs, RAMs, and flash memories.

Examples of the program instructions comprise not only machine language codes such as those generated by a compiler, but also high-level language codes that can be executed by a computer using an interpreter, etc. The hardware devices may be configured to operate as one or more software modules to perform processing according to the present invention, and vice versa.

Although various embodiments of the present invention have been illustrated and described above, the present invention is not limited to the specific embodiments described above, and various modifications can be made by those skilled in the art without departing from the gist of the present invention claimed in the claims, and such modifications should not be individually understood from the technical idea or prospect of the present invention.

The results of verifying the effectiveness of the CAN communication security method of the present invention are as shown in Table 2 below.

TABLE 2

| | | Evaluation Metric | | | |
|---|---|---|---|---|---|
| Attack | ML Model | Accuracy(%) | Precision(%) | Fl-score(%) | Recall(%) |
| DoS | Random forest | 99.691->99.995 | 99.679->99.966 | 99.031->99.983 | 98.391->100 |
| | k-nearst neighbor(k = 10) | 99.866->99.998 | 99.632->99.990 | 99.583->99.995 | 99.533->100 |
| | MLP(2 hidden layers) | 99.462->99.986 | 99.054->99.920 | 98.312->99.955 | 97.582->99.990 |
| | Support vector machine | 98.452->99.983 | 99.333->99.924 | 96.213->99.960 | 93.283->99.997 |
| Gear | Random forest | 99.008->99.991 | 93.877->99.936 | 96.410->99.968 | 99.083->100 |
| | k-nearst neighbor(k = 10) | 99.263->99.987 | 96.257->99.906 | 97.291->99.953 | 98.347->100 |
| | MLP(2 hidden layers) | 98.264->99.993 | 89.466->99.946 | 93.857->99.972 | 98.870->99.999 |
| | Support vector machine | 97.827->99.993 | 89.384->99.958 | 94.130->99.979 | 99.407->100 |
| RPM | Random forest | 99.075->99.993 | 94.498->99.952 | 96.803->99.976 | 99.224->100 |
| | k-nearst neighbor(k = 10) | 99.296->99.997 | 96.978->99.982 | 97.535->99.991 | 98.099->100 |
| | MLP(2 hidden layers) | 98.173->99.999 | 89.270->99.995 | 93.868->99.998 | 98.966->100 |
| | Support vector machine | 97.806->99.997 | 89.337->99.985 | 94.229->99.993 | 99.688->100 |
| Fuzzy | Random forest | 99.539->99.762 | 98.640->98.648 | 98.197->99.079 | 97.757->99.512 |
| | k-nearst neighbor(k = 10) | 99.524->99.780 | 98.710->98.724 | 98.136->99.146 | 97.568->99.571 |
| | MLP(2 hidden layers) | 99.440->99.702 | 98.291->98.307 | 97.788->99.835 | 97.290->99.368 |
| | Support vector machine | 99.380->99.709 | 98.389->98.412 | 97.558->98.869 | 96.740->99.331 |

As shown in Table 2, the CAN communication security method of the present invention was evaluated against four machine learning (ML) algorithms. Regardless of the specific evaluation index used, it can be seen that the attack detection capability of each algorithm is significantly improved through the application of the rule-based filter used in the CAN communication security method of the present invention.

This performance improvement is particularly notable when considering the unique properties of various attack scenarios, and in particular, it was confirmed that the recall metric, which indicates the rate at which attack frames are correctly classified, exceeded 99% after applying the rule-based filter of the present invention.

REFERENCE NUMERALS

100: CAN communication security apparatus 110: communication unit

130: attack type classification unit 150: filtering unit.

The invention claimed is:

1. A CAN (Controller Area Network) communication security method in a CAN communication security apparatus for detecting a CAN bus attack by monitoring a CAN data frame through a CAN bus, comprising:

receiving the CAN data frame;

analyzing the CAN data frame through a pre-learned intrusion detection systems (IDS) model to classify an attack-type of the CAN bus; and filtering the classified attack type based on a pre-established rule, wherein the attack type comprises at least one of a DoS (Denial-of-Service) attack, a spoofing attack, and a fuzzy attack, wherein the filtering comprises accumulatively counting the number of attacks by message ID and payload data of the corresponding CAN data frame whenever the classified attack type is the spoofing attack.

2. The method of claim 1, wherein the filtering comprises accumulatively counting the number of attacks by message ID of the corresponding CAN data frame whenever the classified attack type is the DoS attack.

3. The method of claim 2, wherein the filtering comprises, even if the CAN data frame is classified as normal in the classifying, if the number of attacks of the corresponding CAN data frame exceeds a preset threshold value, finally determining the attack type of the corresponding CAN data frame as the DoS attack.

4. The method of claim 2, wherein the filtering comprises, even if the number of attacks of the CAN data frame classified as the DoS attack in the classifying exceeds a preset threshold value, if the message ID value of the corresponding CAN data frame is greater than a preset ID threshold value based on a message ID value of a normal CAN data frame, finally determining the attack type of the corresponding CAN data frame as normal.

5. The method of claim 1, wherein the filtering comprises, even if the CAN data frame is classified as normal in the classifying, if the number of attacks corresponding to the message ID and payload data of the corresponding CAN data frame exceeds a preset threshold value, finally determining the attack type of the corresponding CAN data frame as the spoofing attack.

6. The method of claim 1, wherein the filtering comprises, if the number of attacks corresponding to the message ID of the CAN data frame classified as the spoofing attack in the classifying exceeds a preset threshold value, if the number of attacks corresponding to the payload data of the corresponding CAN data frame is less than or equal to a preset threshold value, finally determining the attack type of the corresponding CAN data frame as normal.

7. The method of claim 1, wherein the filtering comprises, even if the CAN data frame is classified as normal in the classifying, if the message ID of the corresponding CAN data frame is not included in a message ID set of normal data prepared in advance for real-time control of a vehicle, finally determining the attack type of the corresponding CAN data frame as a fuzzy attack.

8. The method of claim 1, wherein the filtering comprises, even if the CAN data frame is classified as normal in the classifying, if a distance between payload data of current and previous CAN data frames having the message ID of the corresponding CAN data frame and the number of '1' bits in the payload data bytes of the corresponding CAN data frame all satisfy a preset condition, finally determining the attack type of the corresponding CAN data frame as a fuzzy attack.

9. The method of claim 8, wherein the distance between the payload data satisfies the preset condition is a case, in which the distance between the payload data of the current and previous CAN data frames is greater than a distance threshold value set based on distance between consecutive normal CAN data frames having the same message ID in the normal data set used to learn the IDS model.

10. The method of claim 8, wherein the number of '1' bits satisfies the preset condition is a case, in which when the number of '1' bits of more than half of the payload data bytes of the corresponding CAN data frame is greater than the maximum number of '1' bits of payload data bytes of a normal CAN data frame of a normal data set used to learn the IDS model at the same byte position.

11. A computer-readable recording medium having recorded thereon a computer program for performing the method of claim 1.

12. A CAN (Controller Area Network) communication security apparatus for detecting a CAN bus attack by monitoring a CAN data frame through a CAN bus, comprising:

a communication unit that receives the CAN data frame;

an attack-type classification unit that analyzes the CAN data frame through a pre-learned intrusion detection systems (IDS) model to classify an attack-type of the CAN bus; and a filtering unit that filters the classified attack type based on a pre-established rule, wherein the attack type comprises at least one of a DoS (Denial-Of-Service) attack, a spoofing attack, and a fuzzy attack, wherein the filtering unit accumulatively counts the number of attacks by message ID and payload data of the corresponding CAN data frame whenever the classified attack type is the spoofing attack.

* * * * *